United States Patent

[11] 3,572,933

| [72] | Inventor | Roy E. Boostrom |
| | | Elmhurst, Ill. |
| [21] | Appl. No. | 694,518 |
| [22] | Filed | Dec. 29, 1967 |
| [45] | Patented | Mar. 30, 1971 |
| [73] | Assignee | Sargent-Welch Scientific Company |

[54] COMBINATION TEACHING AID AND MONOCHROMATOR UNIT
5 Claims, 9 Drawing Figs.

[52] U.S. Cl. ................................................. 356/100, 35/19
[51] Int. Cl. ............................................. G03b 27/30, G09b 23/06
[50] Field of Search ................................ 35/19, 19.2; 356/74—101

[56] References Cited
UNITED STATES PATENTS

| 2,597,001 | 5/1952 | Jaffe ............................... | 356/83 |
| 2,669,899 | 2/1954 | MacLeish ........................ | 356/100 |
| 2,723,589 | 11/1955 | Bullock et al. ................. | 356/83 |
| 2,868,063 | 1/1959 | Weiss ............................... | 356/99 |
| 3,235,974 | 2/1966 | Hall et al. ....................... | 35/19 |
| 2,613,572 | 10/1962 | Mathieu .......................... | 356/100 |

*Primary Examiner*—Ronald L. Wibert
*Assistant Examiner*—Vincent P. McGran
*Attorney*—Greist, Lockwood, Greenawalt and Dewey ABSTRACT: A monochromator unit adapted to diffract light into monochromatic components and to simplify teaching of a theory of optical instrumental analysis, wherein a housing having an operable top cover portion and a component-protecting but optically transparent cover unit thereunder is provided, said unit also including a mirror means for directing an incident light beam onto a diffraction grating, and wherein the means supporting the mirror means is movable by a cam which is mounted in association with an indicator means and an index for indicating the wavelength of the beam produced, and wherein collimating slits are provided for the incident beam and for directing the beam of monochromatic light onto a directed target area.

In a preferred embodiment, the monochromator includes a cardioid profile cam arrangement, a support for the mirror unit which is supported by a leaf spring on one end and rests on the cam on the other end, and the optical components are mounted on a common base to simplify assembly of the unit. In addition, a construction is described wherein the base of the unit includes two mounting flanges or legs having screw means thereon for providing alignment of said monochromator in relation to a base unit and provides means for locking said monochromator unit in place on a base, said adjustment means and locking means being simple and independent of each other in operation.

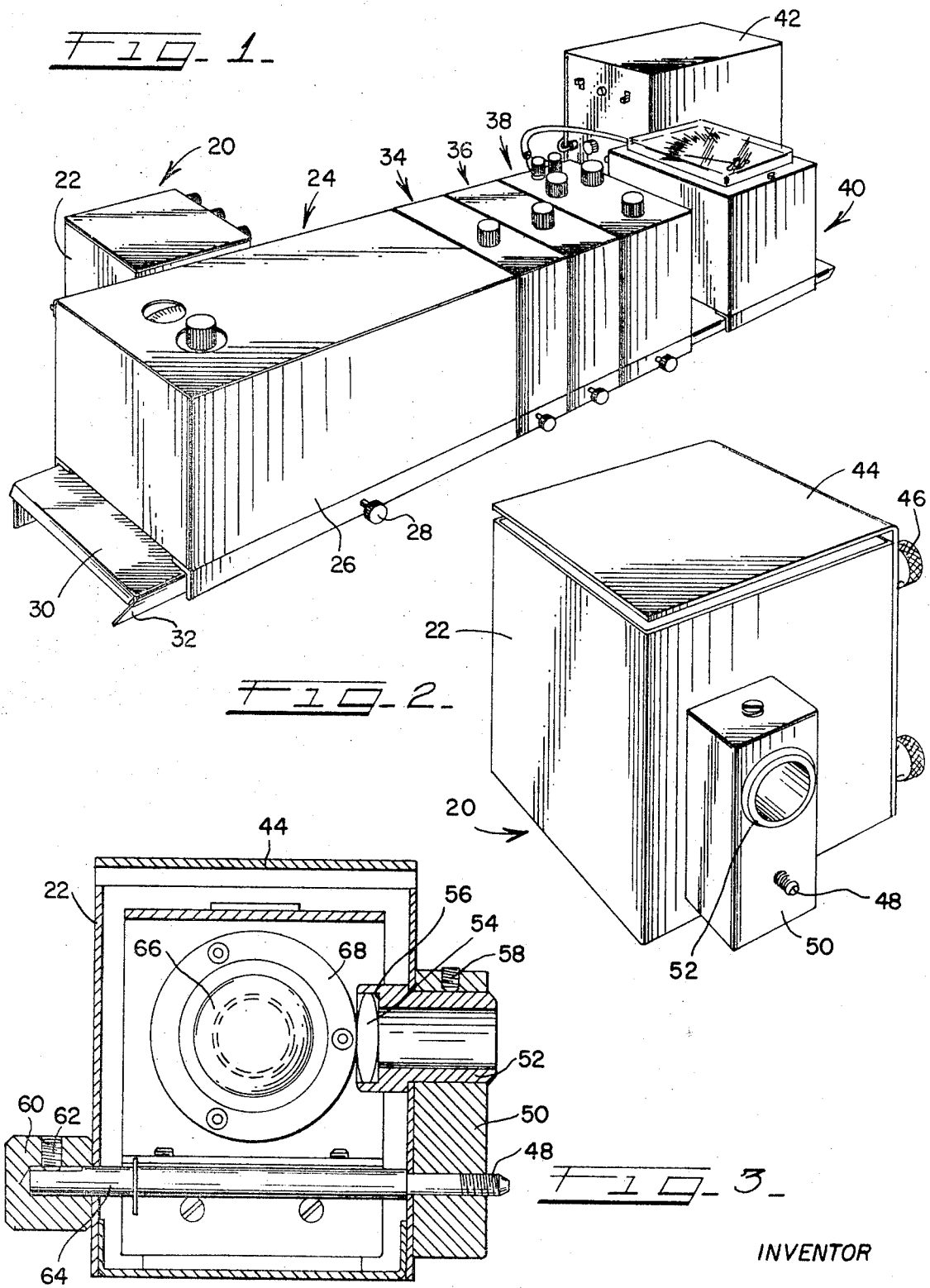

Patented March 30, 1971
3,572,933
3 Sheets-Sheet 2
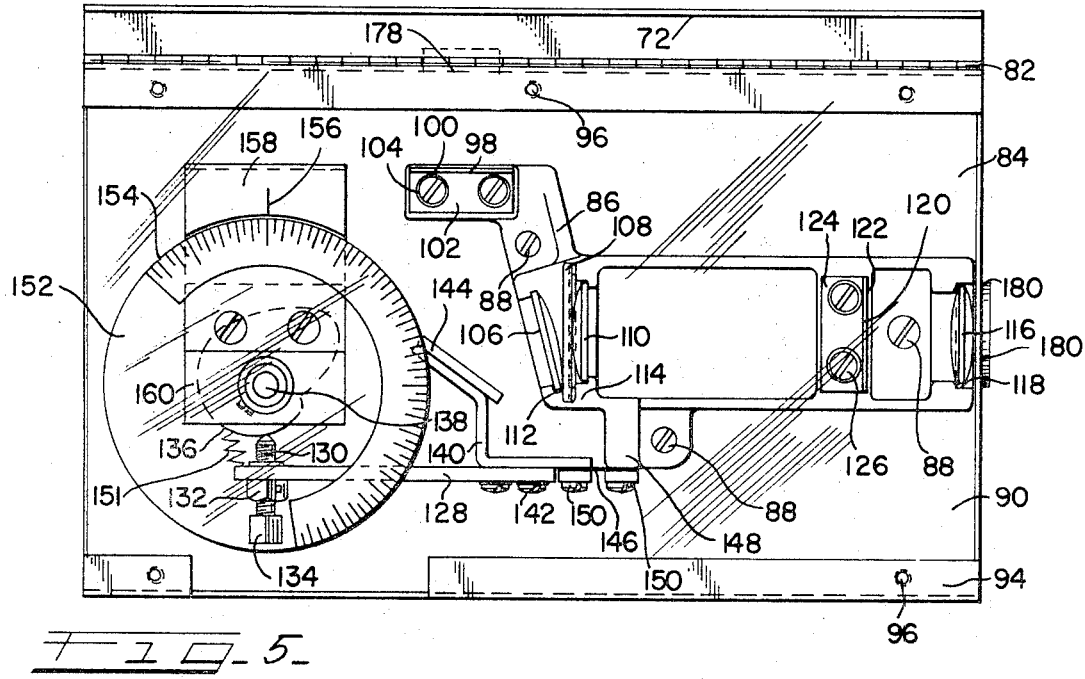
FIG. 5
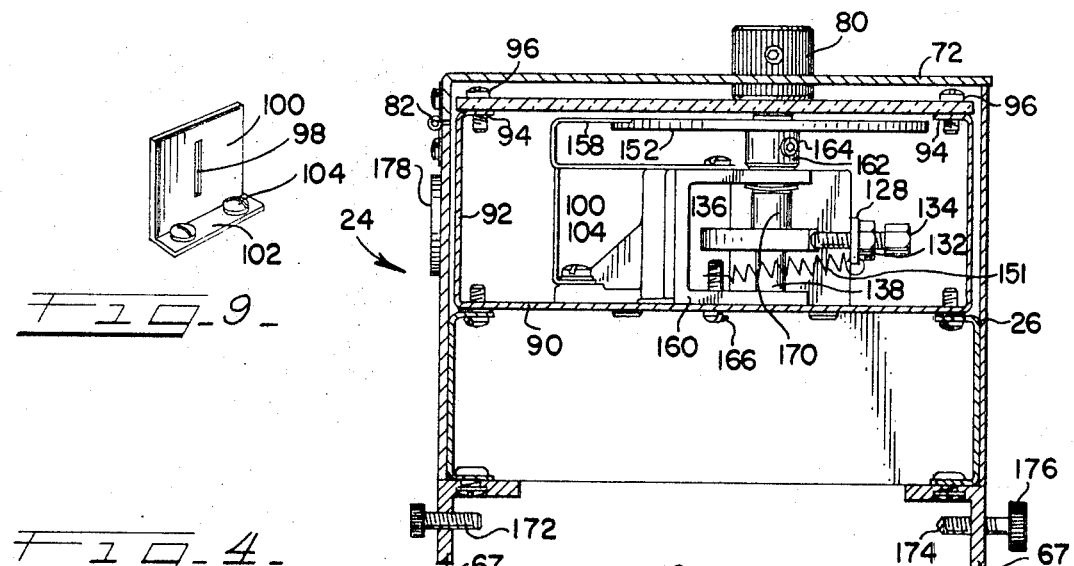
FIG. 9
FIG. 4
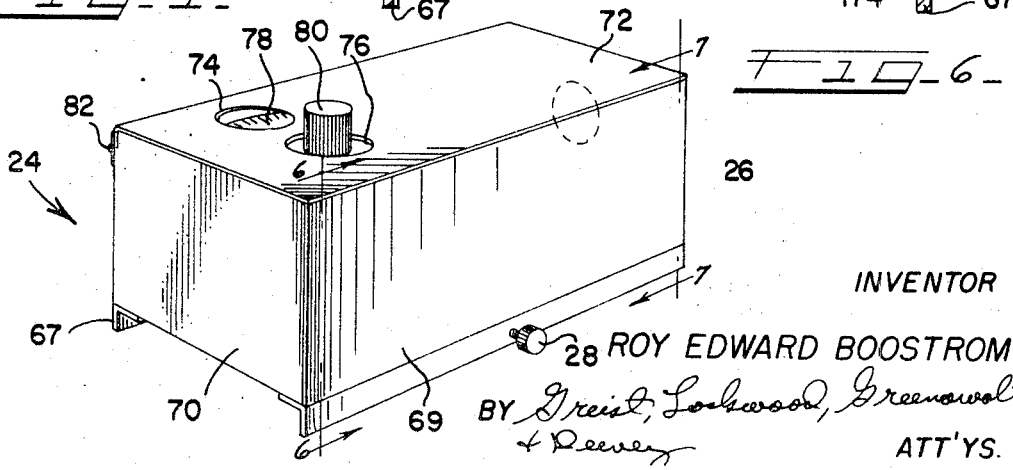
FIG. 6
INVENTOR
ROY EDWARD BOOSTROM
BY Dreist, Lockwood, Greenawalt
& Dewey
ATT'YS.

COMBINATION TEACHING AID AND MONOCHROMATOR UNIT

BACKGROUND OF THE INVENTION

1. Field of the Invention

The field of the invention is that of optical instrumental analysis system components, and also that of teaching aids, wherein the monochromator unit, which is adapted to diffract light into a spectrum comprising a plurality of individual segments having somewhat overlapping wavelengths, is so constructed and arranged as to demonstrate the operation thereof to students. In this way, students may appreciate the functioning of the instrument, as well as the theory on which such instrument is based, and the principles on which it operates. Accordingly, in a teaching aid instrument, the disposition of the components of such an instrument should be such as to contribute to an understanding of the theory on which it is based.

A recent trend in the education field has been that of instruments which may be used as teaching or training aids and which are also capable of high standards of performance for use in an instrumental analysis system. Such instruments have particular value when included as one component of a modular instrumental analysis system containing a plurality of modules, each having a separate function, and which, when assembled in various combinations, form various optical analysis instruments, such as filter colorimeters, turbidimeters, nephalometers, and spectrophotometers.

The present invention is particularly concerned with the novel construction of one component of such module instrument system, namely, a monochromator unit. Particularly, the field of this invention is that of instruments having a layout or configuration which follows a logical progression in relation to accepted teaching methods, and which demonstrates the use of each component of the instrument to produce a result or effect, in a definite sequence which can be readily observed and understood by the student.

BACKGROUND OF THE INVENTION

2. Description of the Prior Art

In general, monochromators themselves are well known in the prior art for, namely, instruments for producing a narrow wavelength band, so that the light thus produced may be used as an aid in instrumental analysis, for example, by determining the extent of which a light of a given wavelength or frequency is absorbed or transmitted by a solution containing a component desired to be analyzed.

Although monochromators of various sorts are known, there still remains a demand for monochromator which is both simple and accurate, which is capable of producing a monochromatic beam of light having a bandwidth of about 20 millimicrons, which is simple enough to be extremely economical, and which also has a layout which facilitates teaching the theory of light diffraction and use of diffracted or monochromatic light in an instrumental analysis system.

Likewise, the prior art does not contain monochromator units of a simplified design which are adapted to be used independently, or as a module in combination with other components of optical analysis systems, such as with sample compartments, detector units and other elements which are detachably assembled in place for analysis purposes, as well as for purposes of teaching and demonstration.

It is believed that the prior art does not disclose a monochromator unit which includes simple but effective alignment means disposed in a portion of the housing thereof and combined with locking means which simplify the alignment of the monochromator relative to other units and which include means for preserving this alignment when the unit is being removed from, moved along the base, or replaced in a different position of use, but desirably with the same orientation with respect to an adjoining or relatively remote module.

SUMMARY OF THE INVENTION

In view of the lack of a known prior art monochromator unit suited for use with other components in a modular system, and lack of a readily available monochromator which can be manufactured economically, which is sturdy and reliable in use, and which affords means for viewing the interior thereof, it is an object of the invention to provide a novel monochromator unit possessing these characteristics and having simplified operational characteristics.

It is a further object of the invention to provide a monochromator in which the optical components thereof may be mounted with respect to a base element which is relatively fixed, and wherein such components may be assembled and calibrated as a unit for subsequent incorporation into a monochromator assembly.

Another object is to provide a monochromator unit having a transparent top portion facilitating study of the interior components thereof, which is in turn coverable by a hinged opaque top cover unit and having knob means for adjusting the output wavelength and indicia means for indicating the wavelength being diffracted to the collimating slit at any time.

Another object is to provide a monochromator having simple means thereon for alignment with respect to a base and permitting removal and replacement of said monochromator independently of said adjustment means.

An additional object is to provide a monochromator wherein the movable mirror is supported on a pivoted assembly wherein the pivot point comprises leaf spring means for serving as a combination pivot point and means for supporting the beam or mirror support unit, while it is in engagement with the cam assembly operatively attached to dial indicator means for displaying the output wavelength of the monochromator unit.

These objects and other objects of the invention, including those inherent therein, are accomplished by providing a combination monochromator and teaching aid unit which includes a housing means, means for allowing entry and exit of a light beam, diffraction means, movable mirror means for directing a light beam at the diffraction means at different angles, support means for movable mounting the mirror means, cam means engaged with the mirror support means, and means for moving the cam and indicating the wavelength of the light being directed to the exit opening of the housing means.

The exact manner in which these objects are attained will become more apparent when considered in connection with a more complete description of the preferred embodiments of the invention, and shown in the drawings in which like characters of reference indicate corresponding parts throughout.

BRIEF DESCRIPTION OF THE DRAWINGS

FIG. 1 is an isometric view showing the monochromator unit of the invention associated with other module components and mounted on the base to form an instrumental analysis system;

FIG. 2 is an isometric view of a light source module of the present invention;

FIG. 3 is a vertical sectional view through the light source module shown in FIG. 2;

FIG. 4 is an isometric view of the monochromator unit of the present invention;

FIG. 5 is a top plan view of the monochromator unit of the invention, shown with the opaque top cover portion thereof in a raised position.

FIG. 6 is a vertical sectional view, taken along lines 6—6 of FIG. 4, showing the monochromator unit;

FIG. 9 is an isometric view of a flange unit having a collimating slit therein.

DESCRIPTION OF THE PREFERRED EMBODIMENTS

Figure 7:
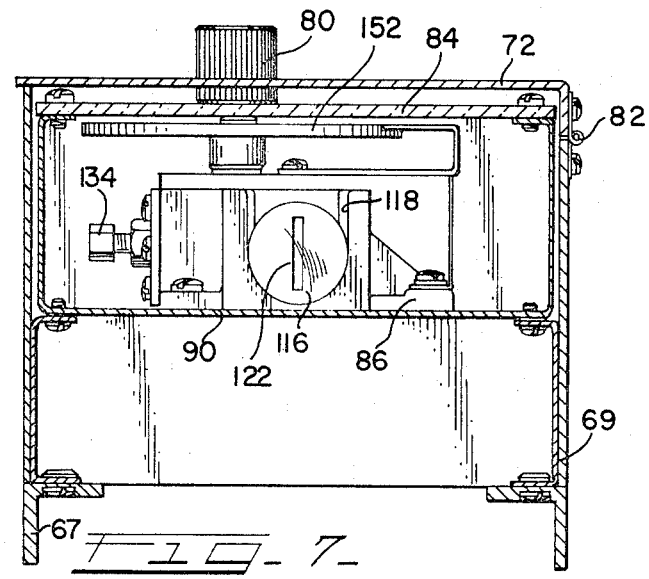
FIG. 7 is a vertical sectional view, taken along lines 7—7 of FIG. 4, showing the monochromator unit of the invention.

Referring now to the drawings in greater detail, FIG. 1 shows a light source module 20, including a housing element 22 therefor, and shows a monochromator unit 24 having an exterior housing 26 and being held in place by a locking screw 28 on a base member 30 having inwardly inclined leg portions 32. This drawing also shows the use of a filter compartment module 34, a sample compartment module 36, a detector module 38, a meter element 40, and a power supply unit 42. It is shown that these modules may be arranged as shown, or in any other known manner to create different optical analysis instruments, one such arrangement being described more fully herein.

Referring now to FIG. 2, the light source module 20, including the housing element 22, is shown to include a top cover 44, fastening means 46 for holding the top cover in place and for providing access to a bulb contained therein, fastening means 48 in the form of a screw for attaching the module to the monochromator unit, a combination spacer and mounting block unit 50, and a cylindrical tube 52 for transmitting light from the bulb or like light source contained inside the light source module 20 to the monochromator 24 to further described herein.

Referring now to FIG. 3, it can be seen that inside the cylinder 52 is disposed a condensing lens 54 held in place in a shoulder 56 of the cylinder 52, and that a setscrew 58 holds the cylinder 52 in place in the combination mounting block and spacer 50. A knob 60 contains a setscrew 62 securing it to a shaft 64 which terminates on the other end thereof in the screw fastener 48. A glass bulb 66, preferably emitting visible polychromatic or white light, is mounted in a receptible assembly 68 of a conventional type. It can be seen that the top cover 44 of the light source module 20 is spaced apart from the remainder of the housing portion 22 to allow passage therethrough of cooling air by convection currents, to avoid overheating the bulb unit.

The light source module just described is necessary for use with the monochromator, but the provision thereof actually forms no part of the present invention, and any suitable, known light source, utilizing visible, UV, or IR light, or a combination thereof, may be used in place of the light source module 20 just described.

Referring now to FIG. 4, the monochromator unit 24 is shown to include leg members 67 extending downwardly therefrom for supporting the locking screw means 28. Likewise, a housing 26 includes a sidewall 69 and an end wall 70, a raisable top cover portion 72, having an index viewing opening 74 and an operating knob opening 76 through which a scale 78 may be viewed as the operating knob 80 is rotated about its axis. Hinge means 82 are provided to allow raising of the cover unit, and the provision of the opaque cover aids in preventing extraneous light from falling into the interior of the housing 26 of the monochromator when it is in use, but allows the cover to be raised for viewing the components thereof when it is desired to do so for study purposes.

Referring now to FIG. 5, the top cover 72 is shown in a raised position, exposing the hinge member 82 and revealing a transparent protective cover 84 for a plurality of components disposed therebeneath. An optical support assembly 86 is fastened as by screws 88, to a floor 90 disposed inside and forming a part of the housing, the floor 90 having upwardly extending wall portions 92 and inwardly directed flanges 94 at the top thereof for receiving fasteners 96 which serve to hold the cover 84 in place. Disposed on the optical support assembly 86 is an entrance collimating slit 98 disposed in a vertically extending flange 100 which extends upwardly from a base 102 where fasteners 104 hold the assembly in place.

A first lens unit 106 is held in place on one end of the diffraction grating 108 and a second lens 110 is held in place on the other end thereof. A plurality-shaped slot members 112 are provided in an upwardly extending projection 114 of the support assembly 86 for this purpose. On the other end of the optical support assembly 86 is disposed an exit lens unit 116, held in place by a slot 118, and inwardly thereof is an exit slit 120 in an upwardly extending flange 122 having a base 124 thereof held on the support assembly 86 by screws 126. An additional fastener 88 is disposed between the exit slit 120 and the lens 116. Thus, removal of the screws 88, allows the entire support assembly, including the diffraction grating 108, and all lenses and slits, to be removed from the instrument as a unit for alignment, focusing, etc., and then placed in position therein upon assembly of the monochromator unit.

Referring again to FIG. 5, there is also shown a mirror support assembly 128 having adjusting means in the form of a screw 130 held in place by a lock nut 132, the screw 130 having a head 134. The screw 130 also comprises means for following a cam 136 which is held in place on a rotatably mounted shaft 138. A mirror mounting flange 140 is held on the support assembly 128 by fasteners 142, and the flange 140 holds a mirror unit 144 which is provided for reflecting light entering the entrance slit 98 to the diffraction grating 108 at varying angles as the shaft 138 holding the cam 136 is rotated. A leaf spring unit 146 connects one end of the mirror support assembly 128 to mirror support assembly holder means in the form of a projection 148 located on the support assembly 86, fasteners 150 serving to hold this unit in place. Thus, the projection 148 is fixed in use, in reaction to the housing 26. A helper spring 151 aids in holding the cam follower screw 130 against the cam 136.

FIG. 5 also shows dial indicator means 152 having indicia 154 thereon, the indicator wheel 152 being fixedly attached in relation to the shaft 138. An index mark 156 is provided in the top surface of the flange 158 which in turn is held on a mounting member 160 which serves to journal the shaft 138 in position. Referring now to FIG. 6, it is shown that the operating knob 80 surmounts the shaft 138 and that a flange 162 with locking means 164 thereon is provided for holding the indicator wheel 152 in place on the shaft 138. In addition, it is shown that a screw member 166 holds the assembly 160 in place on the floor 90 contained inside the housing 26. A collar 170 is provided for fastening the cam 136 to the shaft 138.

Referring again to FIG. 6, there is shown one of the two alignment screws 172 contained on the left side leg member 67 disposed below and forming a part of the housing means 26. Adjustment of the screw means 172, together with adjustment of another identical screw located in a spaced apart position along the leg 67 will result in a desired parallel or angular disposition of the monochromator 24 in relation to the base 30.

On the opposite leg 67 of the housing means 26 is a removal and locking screw 174, having an enlarged head portion 176 for easy handling thereof. This screw 174 may be loosened for sliding the unit along the base 30, or for complete removal from the base 30, and may be tightened upon replacing monochromator unit in the same or in a different position in relation to the base 30. Thus, the alignment of the unit 24 is made by manipulating the aligning screws 172, and the alignment is not affected by removing the unit by means of the locking screw 174.

Referring now to FIG. 7, a view from the exit end of the monochromator unit is shown. This view illustrates the manner in which the optical support assembly 86 contains the slot 118 for supporting the lens 116 which receives the output of the monochromator. This view also shows the overlying relation of the transparent protective cover 84 and the hinge means 82 for mounting the opaque cover in a hinged relation overlying the transparent cover 84. The legs 67 in this view are shown with the alignment screws 172 and adjusting and locking screws 174 removed therefrom.

It will be understood that disposed in a sidewall and an end wall of the housing means 26 are two openings, a sidewall opening 178 and an end wall 180 for admitting light to the slits 98 and to allow exit of the beam of light through the lens 116. Thus, the opening 178 is aligned in position so that when the light source module 20 is located in the position shown in FIG. 1, the cylindrical 2 portion 52 thereof, abuts the opening 178.

In a preferred embodiment of the invention, a diffraction grating is provided which allows a spectral bandwidth of about 20 millimicrons to be generated. A monochromatic light beam within these tolerances is sufficiently precise to enable an instrument to be useful, not only as a teaching aid, but also as a laboratory instrument for light industrial or school use.

Figure 8:
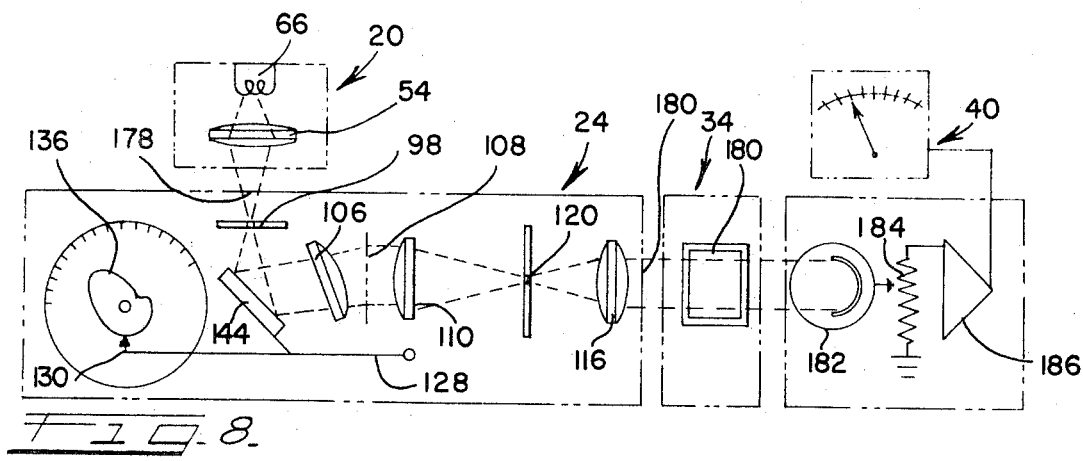
FIG. 8 is a diagrammatical plan view showing the use of the monochromator unit of the invention as one module of a composite spectrophotometer unit.

Referring now to FIG. 8, a partly diagrammatic view is shown which illustrates the relation in use of the monochromator with a light source module 20, and shows the alignment relation of the bulb unit 66 and the condenser lens 54, the opening means 178 in the sidewall of the monochromator 24, and the entrance slit 98 which is provided for focusing the beam coming from the light source 20 onto the mirror 144. The mirror 144 directs the light through the lens 106 which directs the beam to the diffraction grating 108 and thence to a second lens 110 before the light is focused on the exit slit 120 before passing through the outlet lens 116 and out of the opening 180 in the end wall of the unit. As shown, the movement of the mirror support 128 and the cam follower portion 130 thereof are governed by the cardioid profile of the cam means 136. This profile is preferred because it converts the basically nonlinear relation of angular change in the mirror 144 to a linear relation for purposes of having the indicia on the dial means spaced equally apart, thereby facilitating accuracy of instrumental readings, especially in interpolating between adjacent markings.

Likewise, FIG. 8 shows diagrammatically the insertion of the sample compartment 34 and the location of sample container 180 therein, through which the light passes before impinging on photoresponsive means such as the photodiode 182, the output level of the which is coupled through a potentiometer 184 to an amplifier 186. The output of the amplifier 186 is fed to visible display means in the form of a meter 40, cooperatively associated with the unit. Thus, FIG. 8 shows the diagrammatic view of modular spectrophotometer including the monochromator unit of the present invention. This view also illustrates the manner in which the light beam is rendered monochromatic, and thereafter traverses the length of the monochromator, is passed through the sample compartment, and onto the photoresponsive means.

Therefore, it is obvious that the alignment of these modules is important if the correct readings are to be taken of the intensity of the light falling on the diode. Accordingly, the necessity for simple, accurate, and economical means, such as those provided by the present invention, for aligning the monochromator with the base is apparent.

In the construction of the present unit, flange means 100, 122 defining entrance and exit slits 98, 120, have been illustrated, and it is preferred to utilize this construction. However, the filament in the light source may perform this function, in some cases, as is well known in the art.

Other construction variations will also occur to those skilled in the art.

It will thus be seen that the present invention provides a novel Combination Teaching Aid and Monochromator Unit having novel advantages and characteristics including thus pointed out above and others which are inherent in the invention.

I claim:

1. A combination monochromator and teaching aid unit comprising, in combination, housing means, including entrance and exit opening means disposed in said housing means for allowing entry and exit therefrom of a beam of light, mirror means for reflecting at least portions of a beam of light from said entrance opening to said exit opening, diffraction means disposed between said mirror and said exit opening means, a support assembly for said mirror means, said support assembly being adapted for selective positioning of said mirror means and including a cam follower portion operatively associated with said support assembly for said mirror means, support assembly holder means fixed in relation to said housing means, and means movable joining said support assembly for said mirror means to said holder means, means for indicating the wavelength of a light beam diffracted by said diffraction means and directed out of said exit opening, said indicating means being operatively attached to cam means for moving said mirror support assembly in a selected and predetermined manner and means for rotating said cam means, whereby moving said cam means changes the angle between said mirror and said diffraction means, thereby directing differing wavelength portions of a spectrum to said exit opening means as substantially monochromatic light beams, said housing means including a pair of alignment adjusting means extending through one portion of said housing means and a single locking means extending through an oppositely disposed portion of said housing means, whereby alignment may be adjusted with respect to a base unit disposed between said alignment adjusting means and said single locking means independently of the operation of said locking means.

2. The combination unit as defined in claim 1 in which said pair of adjusting means and said single locking means comprise screw units.

3. A combination monochromator and teaching aid unit comprising, in combination, housing means, including entrance and exit opening means disposed in said housing means for allowing entry and exit therefrom of a beam of light, mirror means for reflecting at least portions of a beam of light from said entrance opening to said exit opening, diffraction means disposed between said mirror and said exit opening means, a support assembly for said mirror means, said support assembly being adapted for selective positioning of said mirror means and including a cam follower portion operatively associated with said support assembly for said mirror means, support assembly holder means fixed in relation to said housing means, and means movably joining said support assembly for said mirror means to said holder means, means for indicating the wavelength of a light beam diffracted by said diffraction means and directed out of said exit opening, said indicating means being operatively attached to cam means for moving said mirror support assembly in a selected and predetermined manner, and means for rotating said cam means, whereby moving said cam means changes the angle between said mirror and said diffraction means, thereby directing differing wavelength portions of a spectrum to said exit opening means as substantially monochromatic light beams, said housing unit including at the top portion thereof, an optically transparent protective cover means for protecting the components located on the interior of said housing and for allowing the functioning of said components to be observed, and said housing unit also including an opaque raisable top cover means for covering said top portion of said housing means.

4. A combination monochromator and teaching aid unit comprising, in combination, housing means, including entrance and exit opening means disposed in said housing means for allowing entry and exit therefrom of a beam of light, mirror means for reflecting at least portions of a beam of light from said entrance opening to said exit opening, diffraction means disposed between said mirror and said exit opening means, a support assembly for said mirror means, said support assembly being adapted for selective positioning of said mirror means and including a cam follower portion operatively associated with said support assembly for said mirror means, support assembly holder means fixed in relation to said housing means, means movably joining said support assembly for said mirror means to said holder means, means for indicating the wavelength of a light beam diffracted by said diffraction means and directed out of said exit opening, said indicating means being operatively attached to cam means for moving said mirror support assembly in a selected and predetermined manner, and means for rotating said cam means, whereby moving said cam means changes the angle between said mirror and said diffraction means, thereby directing differing wavelength portions of a spectrum to said exit opening means as substantially monochromatic light beams, flange means defining entrance and exit collimating slits associated with said entrance and exit opening means for collimating a beam of light propagated through said entrance and exit opening means, lens means disposed on either side of said diffraction means, and a unitary optical component support means holding said flange means defining said entrance slit and said exit slit, said diffraction means, and said lens means in place, said support means being supported as a unit for adjustment thereof as a unit in relation to said housing mean.

5. The combination unit as defined in claim 4 in which said support assembly holder means is integrally formed as a projection on said optical component support means.